(12) United States Patent
Kume et al.

(10) Patent No.: US 8,677,524 B2
(45) Date of Patent: Mar. 25, 2014

(54) BED AND COMBINING METHOD

(75) Inventors: Yohei Kume, Osaka (JP); Hideo Kawakami, Osaka (JP); Shohei Tsukada, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 235 days.

(21) Appl. No.: 13/395,530

(22) PCT Filed: Sep. 7, 2010

(86) PCT No.: PCT/JP2010/005484
§ 371 (c)(1),
(2), (4) Date: Mar. 12, 2012

(87) PCT Pub. No.: WO2011/036849
PCT Pub. Date: Mar. 31, 2011

(65) Prior Publication Data
US 2012/0169093 A1 Jul. 5, 2012

(30) Foreign Application Priority Data
Sep. 24, 2009 (JP) ................................ 2009-218432

(51) Int. Cl.
*A47C 13/00* (2006.01)
(52) U.S. Cl.
USPC ...................... 5/86.1; 5/618; 5/613
(58) Field of Classification Search
USPC ............... 5/600–601, 616–619, 613, 86.1
See application file for complete search history.

(56) References Cited

U.S. PATENT DOCUMENTS

| | | | | |
|---|---|---|---|---|
| 3,138,805 A | * | 6/1964 | Piazza | 5/618 |
| 4,240,169 A | * | 12/1980 | Roos | 5/613 |
| 6,584,629 B2 | | 7/2003 | Tsuji et al. | |
| 6,857,147 B2 | * | 2/2005 | Somasundaram | 5/601 |
| 8,336,134 B2 | * | 12/2012 | Jelinek | 5/83.1 |
| 8,474,075 B2 | * | 7/2013 | Kawakami et al. | 5/618 |
| 2001/0029629 A1 | | 10/2001 | Tsuji et al. | |

FOREIGN PATENT DOCUMENTS

| | | |
|---|---|---|
| CN | 200994875 | 12/2007 |
| CN | 201001821 | 1/2008 |
| JP | 62-167527 | 7/1987 |
| JP | 2000-42046 | 2/2000 |
| JP | 2001-293039 | 10/2001 |
| JP | 2005-237516 | 9/2005 |

OTHER PUBLICATIONS

International Search Report issued Oct. 19, 2010 in International (PCT) Application No. PCT/JP2010/005484.

* cited by examiner

*Primary Examiner* — Fredrick Conley
(74) *Attorney, Agent, or Firm* — Wenderoth, Lind & Ponack, LLP

(57) ABSTRACT

A movable part which combines with a stationary part to form a bed includes: a contact sensor (50); wheels (44) rotatable in all directions; a body drive unit (31) which drives the wheels (44); an avoidance instruction unit (51) which generates an avoidance instruction according to a result of detection by a contact sensor (50); a rotation center setting unit (52) which sets a rotation center Q2 for the avoidance instruction; an avoidance instruction translation unit (54) which translates the avoidance instruction and the rotation center Q2 into a move instruction; and a position detection unit (34) which detects a positional relationship to a docking area (20), and the rotation center setting unit (52) sets the rotation center according to the positional relationship detected by the position detection unit (34).

11 Claims, 13 Drawing Sheets

| | Condition | Operation status | Rotation center |
|---|---|---|---|
| Normal operation | — | Operated by joystick | Q1 (0, 0) |
| Self-guidance operation | Ls ≥ 0.70 m (F1) | Robot yet to enter recessed docking area | Q2 (0, 1.5) |
| | 0.70 m (F1) > Ls ≥ 0.10 m (F2) | Robot entering recessed docking area | Q3 (0, -1.5) |
| | Ls < 0.10 m (F2) | Robot just before fitting in docking area (Misalignment in position/orientation ≈ 0) | Q4 (0, -∞) or (0, ∞) |

BED AND COMBINING METHOD

TECHNICAL FIELD

The present invention relates to a bed including a stationary part and a movable part (wheelchair) detachable from the stationary part and a method of combining the stationary part and the movable part.

BACKGROUND ART

In hospitals and nursing-care facilities, patients and care-receivers may move from their rooms where they lie on a bed to other places more than once a day. For the moving, patients and care-receivers are transferred from their beds to wheelchairs usually manually by nurses or care-givers. Such transferring of patients and care-receivers is a heavy physical burden to the nurses and care-givers.

A bed has been proposed which allows separation of part of a base unit of the bed with a patient or a care-receiver staying thereon so that the separated part can be used as a wheelchair, which reduces the heavy physical burdens of the transferring.

There is an electric wheelchair which allows a user to freely operate the electric wheelchair using a joystick. Furthermore, there is an electric wheelchair provided with a contact sensor which reacts to a hit of the electric wheelchair against another object so that the electric wheelchair can automatically avoid the other object.

Here, use of a plurality of contact sensors has been considered to be effective in allowing the electric wheelchair to move into a narrow lane because the electric wheelchair inevitably comes in contact with objects such as a wall.

In this case, the electric wheelchair can make a smooth move with a setting regarding motional properties (see (Equation 1) for a control law) of the electric wheelchair for each of the contact sensors.

[Math. 1]

$$F = M\ddot{X} + D\dot{X} \quad (1)$$

$M \in R^{3\times3}$: Apparent mass property of a wheelchair
$D \in R^{3\times3}$: Apparent viscosity property of a wheelchair
$\dot{X} \in R^3$: Instruction operation velocity of a wheelchair The smooth move means a move of the electric wheelchair including adjustment of orientation upon contact with another object (reaction of the contact sensors) to avoid further contact with the object (contact avoidance operation and orientation adjustment operation). In addition, the smooth motion also means a quick move of the electric wheelchair upon reaction of the contact sensors in order to lessen an impact on the electric wheelchair.

Such a smooth move (contact avoidance operation and orientation adjustment operation) can be made by appropriately adjusting operation of the electric wheelchair (in three components of x-axis translation, y-axis translation, and z-axis rotation) as a function of contact detected by the contact sensors. Specifically, upon contacting with another object, the electric wheelchair makes a smooth move by lowering the apparent mass property M and the apparent viscosity property D, which are included in the motional properties of the wheelchair in (Equation 1).

Aside from the electric wheelchair, a cleaning robot has been proposed as shown in FIG. 14 (for example, see PTL 1). The cleaning robot 5 includes a laser sensor 1, an ultrasonic sensor 2, and a contact sensor 3, and autonomously travels by driving wheels 4 with recognition of positional relationships with other objects. The cleaning robot 5 is provided with the ultrasonic sensor 2 which detects an obstacle on its path and the contact sensor 3 which detects contact with an obstacle. The cleaning robot 5 cleans under control of a control unit so that the cleaning robot 5 can avoid obstacles detected by the sensors.

CITATION LIST

Patent Literature

[PTL 1] Japanese Unexamined Patent Application Publication No. 62-167527

SUMMARY OF INVENTION

Technical Problem

As described above, in order to allow the electric wheelchair to make a smooth move, the motion of the electric wheelchair (in the three components of x-axis translation, y-axis translation, and z-axis rotation) needs to be appropriately adjusted as a function of contact of the electric wheelchair with another object detected by the contact sensors. Furthermore, upon contacting with another object, the electric wheelchair makes a smooth move by lowering the apparent mass property M and the apparent viscosity property D, which are included in the motional properties of the wheelchair in (Equation 1). On the other hand, when moving out of contact with an object, the electric wheelchair adjusts the motion by increasing the apparent mass property M (or restoring the original apparent mass property M). This adjustment allows an operator to operate the wheelchair with ease.

However, the operation has a problem that it is complicated to adjust parameters so as to appropriately coordinate the three motions of x-axis translation, y-axis translation, and z-axis rotation as a function of contact of the electric wheelchair.

For example, in the case where a contact force fa (fa∈R) in a certain direction is detected, avoidance operation and orientation adjustment operation are performed according to (Equation 2) based on fa detected.

[Math. 2]

$$f_a = [M_a^x \ M_a^y \ M_a^\theta] \begin{bmatrix} \dot{v}_a^x \\ \dot{v}_a^y \\ \dot{\omega}_a \end{bmatrix} + [D_a^x \ D_a^y \ D_a^\theta] \begin{bmatrix} v_a^x \\ v_a^y \\ \omega_a \end{bmatrix} \quad \text{(Equation 2)}$$

Here, the apparent mass property M and the apparent viscosity property D are each represented as 1-by-3 matrices so that the apparent mass property M and the apparent viscosity property D are associated with a motion along the x-axis, a motion along the y-axis, and a rotation around the z-axis based on the contact force fa.

Thus, the avoidance operation and orientation adjustment operation based on the contact force fa requires adjustment of six parameters associated each other, which results in complicated control problems.

In view of the problem, the present invention has an object of providing a bed and a combining method which allow a smooth move with adjustment of a small number of parameters.

Solution to Problem

In order to achieve the object, a bed according to an aspect of the present invention includes: a stationary part; and a movable part capable of being docked in a docking area which is a recess in the stationary part, wherein the movable part includes: a contact sensor which detects a contact force generated by contact with another object; an avoidance instruction unit configured to generate an avoidance instruction according to the contact force received from the contact sensor, the avoidance instruction being information regarding a rotation of the movable part; a position detection unit configured to detect a positional relationship of the movable part to the docking area; a rotation center setting unit configured to set, according to the positional relationship detected by the position detection unit, a rotation center for the avoidance instruction generated by the avoidance instruction unit; and a control unit configured to move the movable part around the rotation center set by the rotation center setting unit.

Furthermore, in order to achieve the object, a method according to an aspect of the present invention is a method of combining a movable part and a stationary part having a docking area which is a recess in the stationary part, by docking the movable part in the docking area to form a bed including the movable part, the stationary part, and the docking area, and includes: detecting a contact force generated by contact of the movable part with another object, using a contact sensor included in the movable part; generating an avoidance instruction according to the contact force received from the contact sensor, the avoidance instruction being information regarding a rotation of the movable part; detecting a positional relationship of the movable part to the docking area; setting, according to the detected positional relationship, a rotation center for the avoidance instruction; and performing an avoidance operation by moving around the set rotation center.

Advantageous Effects of Invention

In order to address the problem, the present invention provides a bed and a combining method which allow a smooth move with adjustment of a small number of parameters.

DESCRIPTION OF EMBODIMENTS

Figure 1:
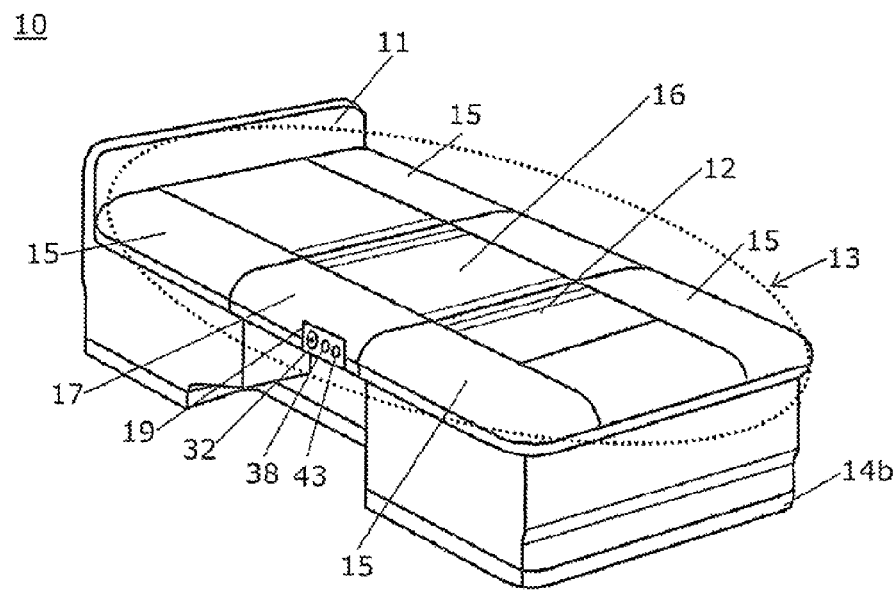
FIG. 1 illustrates a perspective view of a bed according to Embodiment 1 of the present invention.

A bed according to an aspect of the present invention includes: a stationary part; and a movable part capable of being docked in a docking area which is a recess in the stationary part, wherein the movable part includes: a contact sensor which detects a contact force generated by contact with another object; an avoidance instruction unit configured to generate an avoidance instruction according to the contact force received from the contact sensor, the avoidance instruction being information regarding a rotation of the movable part; a position detection unit configured to detect a positional relationship of the movable part to the docking area; a rotation center setting unit configured to set, according to the positional relationship detected by the position detection unit, a rotation center for the avoidance instruction generated by the avoidance instruction unit; and a control unit configured to move the movable part around the rotation center set by the rotation center setting unit.

With this, an appropriate rotation center is set according to the positional relationship between the stationary part and the movable part moving to combine with the bed, so that the stationary part and the movable part can be smoothly combined.

Furthermore, the position detection unit may be configured to obtain a reference point distance Ls which is a distance to a reference point on the docking area, and the rotation center setting unit may be configured to set the rotation center according to the reference point distance Ls.

With this, the positional relationship between the stationary part and the movable part can be determined in one dimension so that the stationary part and the movable part can be quickly and smoothly combined.

Furthermore, the bed may further include a plurality of contact sensors each of which is associated with a different rotation center.

With this, fine detection of contacts with other objects is possible so that the stationary part and the movable part can be combined more smoothly.

A method according to an aspect of the present invention is a method of combining a movable part and a stationary part having a docking area which is a recess in the stationary part, by docking the movable part in the docking area to form a bed including the movable part, the stationary part, and the docking area, and includes: detecting a contact force generated by contact of the movable part with another object, using a contact sensor included in the movable part; generating an avoidance instruction according to the contact force received from the contact sensor, the avoidance instruction being information regarding a rotation of the movable part; detecting a positional relationship of the movable part to the docking area; setting, according to the detected positional relationship, a rotation center for the avoidance instruction; and performing an avoidance operation by moving around the set rotation center.

With this, an appropriate rotation center is set according to the positional relationship between the stationary part and the movable part moving to combine with the bed, so that the stationary part and the movable part can be smoothly combined.

Furthermore, a reference point distance Ls, which is a distance from the movable part to a reference point on the docking area, may be obtained as the positional relationship.

With this, the positional relationship between the stationary part and the movable part can be determined in one dimension so that the stationary part and the movable part can be quickly and smoothly combined.

Embodiments of the present invention shall be described below with reference to the drawings. In the following description, the same components are denoted with the same reference signs, and the description thereof is accordingly omitted.

Embodiment 1

Figure 2:
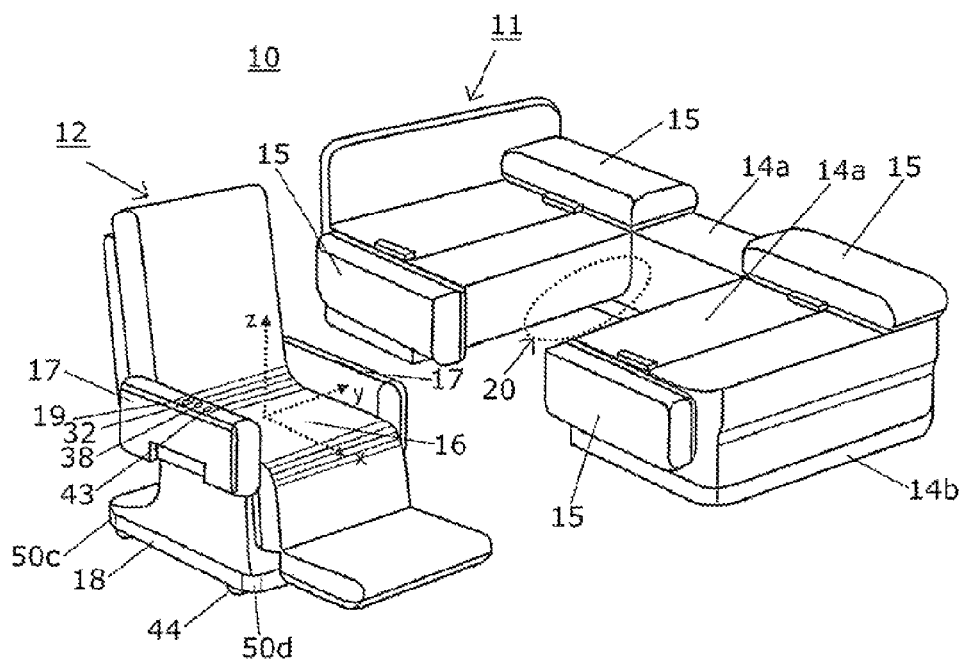
FIG. 2 illustrates a perspective view of a stationary part and a movable part separated from each other according to Embodiment 1.

FIG. 1 illustrates a perspective view of a bed 10 according to Embodiment 1 of the present invention. FIG. 2 illustrates perspective views of a stationary part 11 and a movable part 12 into which the bed 10 is separated. The movable part 12 is a traveling vehicle (wheelchair).

The bed 10 according to Embodiment 1 includes the stationary part 11 and the movable part 12. In particular, the movable part 12 characteristically sets a rotation center to an appropriate position as necessary. The rotation center is used as a reference for control of drive of the movable part 12.

First, a configuration of the bed 10 including the movable part 12 and the stationary part 11 shall be described.

For ease of understanding, a coordinate system having an x-axis, a y-axis, and a z-axis which are mutually orthogonal is set for the movable part 12 as shown in FIG. 2. A plane containing the x-axis and the y-axis is a horizontal plane parallel to the ground. The x-axis extends in the front direction of the movable part 12 (the direction of the front of the person sitting in the movable part 12). The z-axis extends upward in the vertical direction. The coordinate system has an origin at the center of a pedestal trolley unit 18 (see below).

As shown in FIG. 1 and FIG. 2, the bed 10 according to Embodiment 1 includes a stationary part 11 and the movable part 12. The stationary part 11 has a docking area 20. The movable part 12 is a movable body.

The stationary part 11 includes a bed base unit 14a, a foot unit 14b supporting the bed base unit 14a, and stationary part lateral base units 15.

The movable part 12 is capable of separating from and combining with the stationary part 11. In addition, the movable part 12 is capable of transforming between a flat position and a chair position, and also serves as an electric wheelchair which moves in the chair position. In addition, the movable part 12 includes a seat unit 16, armrest units 17, and the pedestal trolley unit 18. The seat unit 16 and the armrest units 17 of the movable part 12 serve as part of a base unit 13 of the bed 10 when the movable part 12 and the stationary part 11 combine to form the bed 10. The stationary part 11 has a recess in the middle part of a lateral face thereof. The movable part 12 fits in the recess (the docking area 20) such that the stationary part 11 and the movable part 12 combine.

When the stationary part 11 and the movable part 12 form the bed 10 in combination (see FIG. 1), the stationary part lateral base unit 15, the seat unit 16, and the armrest units 17 form the base unit 13.

In addition, an operation panel 19 is provided on either of the armrest units 17 (see FIG. 1 and FIG. 2). The operation panel 19 allows users to control operation of the bed 10 (both of the stationary part 11 and the movable part 12). The operation panel 19 is a panel which allows remote control of the stationary part 11 and the movable part 12. The operation panel 19 is located on a lateral side of the base unit 13 when the stationary part 11 and the movable part 12 combine (the state shown in FIG. 1), and located on the top of one of the armrest units 17 when the movable part 12 is functioning as a electric wheelchair (the state shown in FIG. 2). The operation panel 19 is thus movable together with the armrest units 17.

The operation panel 19 includes a joystick 32, a self-guidance start switch 38, and a separation switch 43. A patient or a care-receiver can easily operate the bed 10 using the operation panel 19.

The bed 10 in such a configuration allows a patient or a care-receiver lying thereon in a posture for easy back raising or leg raising to directly separate or combine the movable part 12 and the stationary part 11 of the bed 10. The bed 10 thus allows the patient or the care-receiver not only to lie on the bed 10 with comfort but also to transform the movable part 12 into a safe and comfortable electric wheelchair. The bed 10 thereby put a less burden to a care-giver.

In addition, because the electric wheelchair (movable part 12) is integrated with the stationary part 11, forming the bed 10 together, no particular space for stowing the electric wheelchair (movable part 12) is necessary while the electric wheelchair is used as part of the bed 10. The electric wheelchair (movable part 12) includes a drive unit so that the electric wheelchair can be also manually driven by an operation using the joystick 32 of the operation panel 19.

Furthermore, the movable part 12 is also an autonomous traveling vehicle which can autonomously transit from a state in which the movable part is 12 is separated from the stationary part 11 as shown in FIG. 2 to a state in which the movable part 12 is combined with the stationary part 11 as shown in FIG. 1. A laser distance sensor provided to the movable part 12 measures data of relative polar coordinates of the docking area 20 of the stationary part 11, and the movable part 12 automatically moves into the docking area 20 with autonomously adjusting its approaching position and orientation.

Then, the movable part 12 performs an avoidance operation when the contact sensor of the movable part 12 comes in contact with a wall of the docking area 20.

The approaching position adjustment, orientation adjustment, and avoidance operation performed by the movable part 12 shall be described below in detail.

Figure 3:
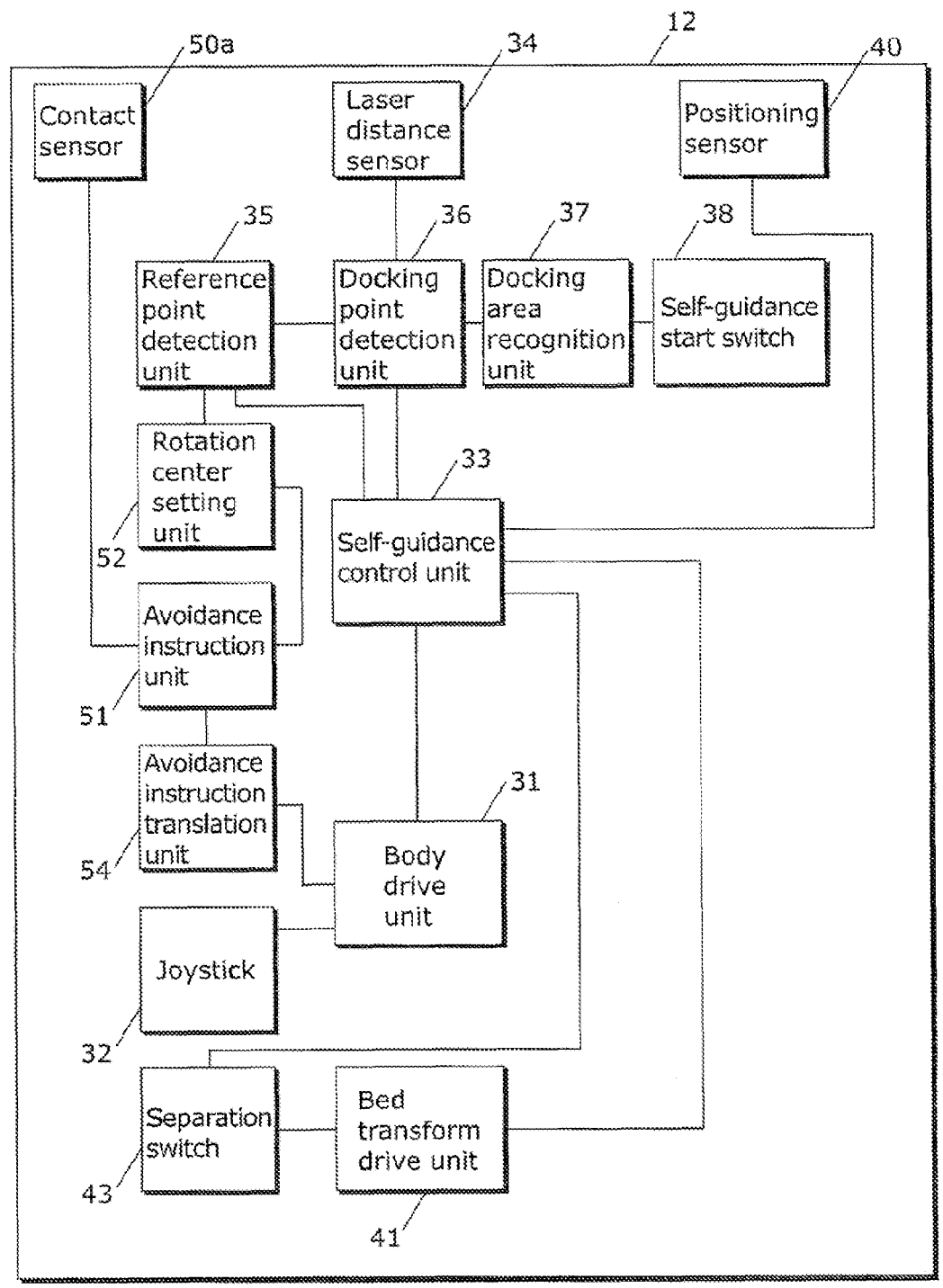
FIG. 3 is a block diagram of the movable part according to Embodiment 1.

FIG. 3 illustrates a block diagram showing both mechanical units and functional units of the movable part 12.

In addition, the movable part 12 includes a moving unit which allows the movable part 12 to travel in all directions. Here, the operation "to travel in all directions" means to move the movable part 12 by controlling a move of the movable part 12 on an x-y plane and a rotation of the movable part 12 around the z-axis in a manner such that the move on the x-y plane and the rotation around the z-axis are independent of each other. In other words, the moving unit is capable of changing the position of the movable part 12 on a floor with a relationship between the set of the x-axis and the y-axis of the movable part 12 and the set of an x-axis and a y-axis which are virtually fixed to the floor on which the movable part 12 travels maintained. In Embodiment 1, the moving unit includes four wheels 44 and a body drive unit 31.

The movable part 12 includes the four wheels 44 which are rotatable in all directions, the pedestal trolley unit 18 supported by the four wheels 44, the body drive unit 31 which provides independent driving forces to the four respective wheels 44, the joystick 32 which issues direct instructions to the body drive unit 31 to go or stop or to travel in a direction, and a self-guidance control unit 33 which adjust an approaching position adjustment and orientation of the movable part 12.

The movable part 12 further includes a laser distance sensor 34, a docking point detection unit 36 which detects docking points based on the data of polar coordinates detected by the laser distance sensor 34, and a reference point detection unit 35 which calculates a reference point distance Ls (see FIG. 4) to a reference point Ps on the docking area 20 based on the data of polar coordinates of the docking points detected by the docking point detection unit 36. The laser distance sensor 34 measures data of relative polar coordinates of an object, that is, a distance between the movable part 12 and a part of an object, and an angle of the object on the x-y plane with reference to the movable part 12 by scanning a detection area with laser on the basis of a predetermined angle. In Embodiment 1, the laser distance sensor 34 and the reference point detection unit 35 also function as a position detection unit which detects a positional relationship of the movable part 12 to the docking area 20.

Figure 4:
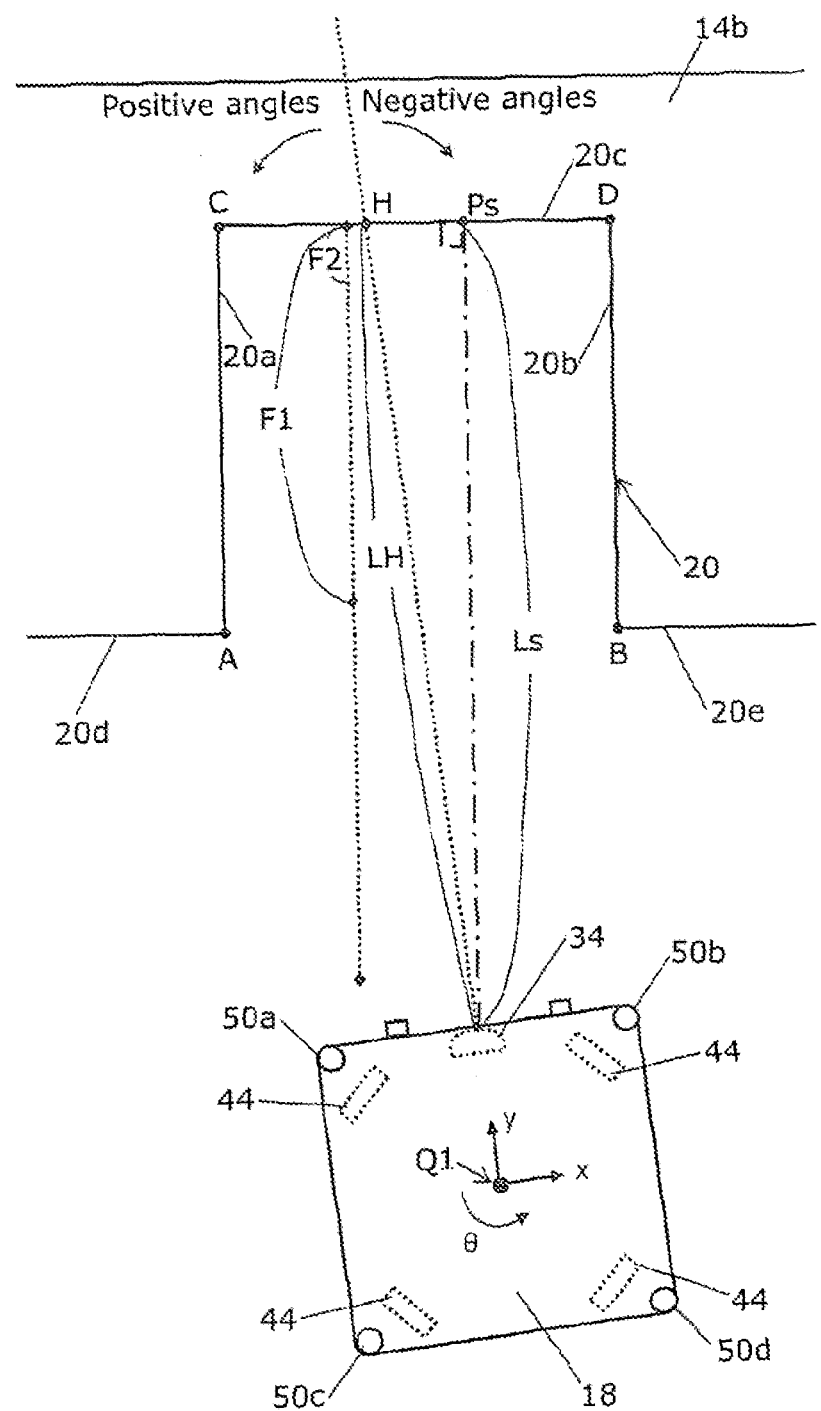
FIG. 4 illustrates a top view of the movable part and a foot unit of stationary part according to Embodiment 1.

Here, the docking points detected by the docking point detection unit 36 are five points of a point A, a point B, a point C, a point D, and a center point H as shown in FIG. 4. The point A is a point on the stationary part 11 at the shortest distance from the movable part 12 within a range of positive angles. The point B is a point on the stationary part 11 at the shortest distance from the movable part 12 within a range of negative angles. The point C is a point on the stationary part 11 at an angle between the angles of the point A and the point B, and is at the longest distance from the movable part 12 within the range of positive angles. The point D is a point on the stationary part 11 at an angle between the angles of the point A and the point B, and is at the longest distance from the movable part 12 within the range of negative angles. The point H is a point on the stationary part 11 such that data of polar coordinates of the point indicates an angular coordinate of zero degree.

Here, the positive angles are angles within a range of 0 to 180 degrees from the y-axis of the movable part 12 not in motion in the counterclockwise rotational direction (see FIG. 4) around the position of the laser distance sensor 34 on the y-axis. On the other hand, the negative angles are angles within a range of 180 to 360 degrees, or 0 to −180 degrees in the same case as the positive angles.

The laser distance sensor 34 is provided at the center of the left lateral face of the pedestal trolley unit 18 (left side of an operator sitting in the movable part 12). The laser distance sensor 34 is provided in the left lateral face of the pedestal trolley unit 18 because the movable part 12 is designed to slide leftward to enter the docking area 20. Here, in the case where the movable part 12 is designed to slide to the left side of a person (operator) sitting in the movable part 12 to enter the docking area 20, the laser distance sensor 34 is preferably provided on the right side of the pedestal trolley unit 18. In this case, the laser distance sensor 34 is provided at the center of the right lateral face of the pedestal trolley unit 18.

The movable part 12 further includes a docking area recognition unit 37 and a self-guidance start switch 38. The docking area recognition unit 37 recognizes whether or not the four side of a quadrilateral having, as vertices, the point A, the point B, the point C, and the point D detected by the docking point detection unit 36 is the four sides of the docking area 20. When the docking area recognition unit 37 recognizes the object as the docking area 20, the self-guidance start switch 38 lights up and waits for an operator's instruction. The self-guidance start switch 38 is disposed on the operation panel 19.

The movable part 12 further includes a positioning sensor 40 which determines whether or not combining the movable part 12 and the stationary part 11 is completed. The movable part 12 further includes a bed transform drive unit 41 and a separation switch 43 which issues an instruction to the stationary part 11 and the movable part 11 in combination to separate. The separation switch 43 is disposed on the operation panel 19. The bed transform drive unit 41 causes the movable part 12 to transform from a flat position to a chair position and from the chair position to the flat position.

The movable part 12 further includes a contact sensor 50a, an avoidance instruction unit 51, a rotation center setting unit 52, and an avoidance instruction translation unit 54. The contact sensor 50a detects a contact force movable part upon contact with another object. The avoidance instruction unit 51 generates an avoidance instruction to cause the movable part 12 to avoid another object with adjusting its orientation according to the result of the detection by the contact sensor 50a. The rotation center setting unit 52 sets a rotation center for the rotational instruction based on the reference point distance Ls. The avoidance instruction translation unit 54 translates the avoidance instruction into a move instruction.

FIG. 3 shows only one contact sensor, that is, the contact sensor 50a, but the movable part 12 actually includes four contact sensors (50a, 50b, 50c, and 50d) at the four respective corners of the movable part 12, which is square in cross section as shown in FIG. 4.

Since it is one of the four corners that is likely to come in contact with an object such as a wall before any other part of the movable part 12 when the movable part 12 hits against such an object, the contact with such an object can be detected with a high probability when the contact sensors 50 are provided at the four corners. In other words, the first contact of the movable part 12 with an object such as a wall can be detected with a high probability when the contact is between one of the corners and such an object.

Furthermore, it is preferable that the contact sensors 50 be capable of detecting contact force in at least one of the x-axis direction and the y-axis direction.

It should be noted that the wall may be either a general wall or, in Embodiment 1, any of the lateral walls 20a, 20b, 20d, and 20e of the docking area 20 (see FIG. 4).

When the movable part 12 enters the docking area 20, the orientation of the movable part 12 is likely to oblique to the docking area 20s. Then, the part to hit against the lateral walls 20a, 20b, 20d, or 20e is likely to be one of the corners of the pedestal trolley unit 18 at which the contact sensor 50a and the contact sensor 50b are provided.

It should be noted that, in Embodiment 1, different rotation centers are preset for the respective contact sensors 50. When a contact sensor 50 reacts, the rotation center setting unit 52 sets a rotation center corresponding to the contact sensor 50, and then a rotation velocity around the set rotation center is generated so that the movable part 12 performs an avoidance operation.

Here, when one of the contact sensors reacts, a rotation velocity around the rotation center corresponding to the contact sensor which has reacted is generated so that the movable part 12 performs an avoidance operation. When two of the contact sensors react around the same time, rotation velocities around the respective rotation centers each corresponding to the contact sensors which have reacted may be generated so that an operation velocity at which the movable part 12 performs an avoidance operation is generated by combining the two rotation velocities. It should be noted that the phrase of "around the same time" is used to mean both "at the same time" and "at approximately the same time".

The following will describe cases where the movable part 12 can combine with the stationary part 11 by self-guidance.

Figure 5:
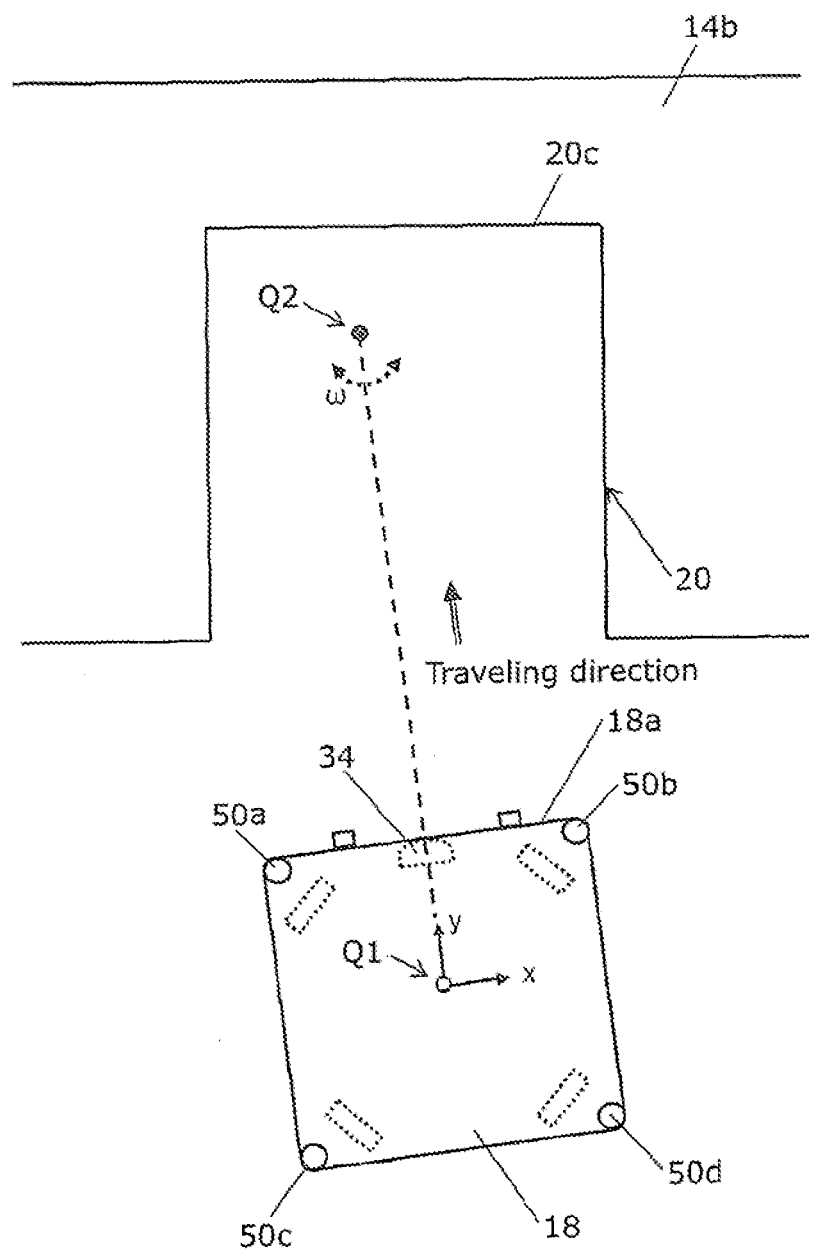
FIG. 5 illustrates a top view of the movable part and the foot unit of stationary part according to Embodiment 1 in the case where a reference point distance Ls is equal to or longer than F1.
Figure 8:
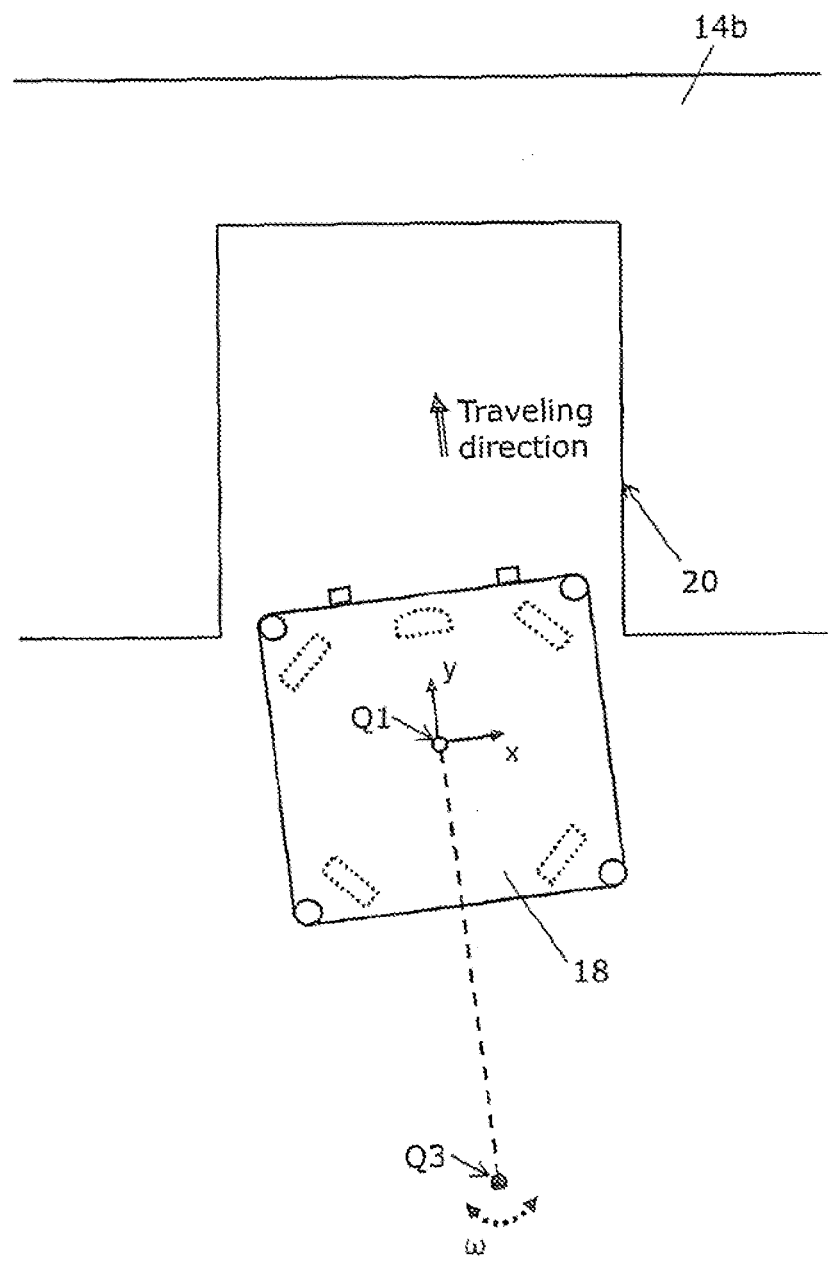
FIG. 8 illustrates a top view of the movable part and the foot unit of stationary part according to Embodiment 1 in the case where the reference point distance Ls is equal to or longer than F2 and shorter than F1.

FIG. 4 illustrates a top view showing the pedestal trolley unit 18 of the movable part 12 and the foot unit. A rotation velocity ω shown in FIG. 5 is an angular velocity of a rotation around a point Q2 which is a rotation center. A rotation velocity ω shown in FIG. 8 is an angular velocity of a rotation around a point Q3 which is a rotation center.

First, in order to combine the stationary part 11 and the movable part 12 separated, an operator uses the joystick 32 so as to move the movable part 12 closer to the docking area 20. At this time, the operator moves the movable part 12 so that the laser distance sensor 34 of the movable part 12 (the pedestal trolley unit 18) faces the docking area 20. Since the laser distance sensor 34 is provided in the left lateral face in the y-axis direction of the pedestal trolley unit 18, the operator aboard the movable part 12 uses the joystick 32, looking leftward.

Here, the joystick 32 includes a lever disposed so as to extend along the z-axis when in neutral (not shown), and outputs data as to the angle and direction of a tilt of the lever when the operator tilts the lever in at least one of the x-axis direction and the y-axis direction. Furthermore, the joystick 32 outputs data as to the direction (positive or negative) and amount (angle) of a rotation when the operator rotates the lever around the shaft of the lever.

Such operation of the joystick 32 generates a move instruction and the body drive unit 31 drives the wheels 44 according the move instruction. The wheels 44 can rotate in all directions. Specifically, omni wheels are used as the wheels 44.

The move instruction is issued to the body drive unit 31 and specifies an instruction operation velocity in the x-axis direction, the y-axis direction, and the z-axis rotation. The instruction operation velocity in the x-axis direction depends on the angle of a tilt of the joystick 32 in the x-axis direction. The instruction operation velocity in the y-axis direction depends on the angle of a tilt of the joystick 32 in the y-axis direction. The instruction operation velocity in the z-axis rotation depends on the angle of a rotation of the joystick 32. Here, the rotation center is the z-axis, which is shown as a point Q1 in FIG. 4. The point Q1 is the center of the pedestal trolley unit 18 and is represented by a coordinate set of (0, 0).

The self-guidance control unit 33 also issues a move instruction to the body drive unit 31 in order to control a move of the movable part 12.

Here, the laser distance sensor 34 provided in the lateral face 18a of the pedestal trolley unit 18 is a laser distance sensor having a detection area of ±60 degrees (with reference to the y-axis at a degree of zero), an effective distance of four meters, and an angular resolution of one degree. The detection area is a range across which the laser distance sensor is capable of detecting an object and measures a distance to the foot unit 14b and an angle thereof.

Then, in order to detect the recess (docking area 20) in the foot unit 14b, the docking point detection unit 36 detects the point A, point B, point C, and point D on the foot unit 14b from the data of polar coordinates measured by the laser distance sensor 34. The recess in the foot unit 14b is the docking area 20, but the docking area 20 is referred to as a recess in the foot unit 14b because the movable part 12 has not yet recognized the recess in the foot unit 14b as the docking area 20.

It should be noted that the point C and the point D are detected only when they are at angles between the angles of the point A and the point B. This is in order to detect a recess in the foot unit 14b.

The docking area recognition unit 37 then recognizes whether or not a quadrilateral having, as vertices, the four points detected by the docking point detection unit 36 is the docking area 20.

The docking area recognition unit 37 performs the recognition by comparing the dimensions of four sides calculated from the data of the polar coordinates of the four points detected by the laser distance sensor 34 and pre-registered data of the docking area 20. In other words, the docking area recognition unit 37 recognizes whether or not the quadrilateral having, as vertices, the point A, the point B, the point C, and the point D detected by the laser distance sensor 34 is the docking area 20 in which the movable part 12 is to dock.

Here, the dimensions of the four sides of the docking area 20 are AB=CD=0.80 m, and AC=BD=0.85 m. The movable part 12 is a square, 0.75 m on a side.

In addition, the docking area recognition unit 37 determines whether or not the self-guidance as described above is possible each time the laser distance sensor 34 scans the detection area. Here, the state in which the self-guidance is possible is a state that the docking area recognition unit 37 recognizes that the quadrilateral having, as vertices, the point A, the point B, the point C, and the point D detected by the laser distance sensor 34 is the docking area 20 in which the movable part 12 is to dock.

When the self-guidance is possible, the self-guidance start switch 38 lights up. By seeing the self-guidance start switch 38 lighting, the operator knows that the movable part 12 is ready to automatically combine with the stationary part 11. When the operator who wants the movable part 12 to combine with the stationary part 11 presses the self-guidance start switch 38, the bed transform drive unit 41 is activated so that a lower part (foot side) of the seat unit 16 is elevated above the bed base unit 14a. When the lower part (foot side) of the seat unit 16 is elevated high enough not to hit against the bed base unit 14a, the self-guidance control unit 33 issues an operation instruction to the body drive unit 31. When the body drive unit 31 receives the operation instruction, the movable part 12 combines with the stationary part 11 with adjusting its approaching position and orientation with respect to the y-axis direction. Meanwhile, the operator aboard the movable part 12 moves sideways.

Next, how the movable part 12 autonomously enters the docking area 20 of the stationary part 11 shall be described below. In order for the movable part 12 to smoothly enter the docking area 20, control laws of adjustment of the approaching position and orientation of the movable part 12 need to be changed according to a positional relationship between the movable part 12 and the docking area 20.

For this purpose, the self-guidance control unit 33 obtains the reference point distance Ls obtained by the reference point detection unit 35. Here, the reference point distance Ls is a length of a line which is perpendicular to the lateral wall 20c of the docking area 20 and extends to the laser distance sensor 34 as shown in FIG. 4. The intersection between the perpendicular line and the lateral wall 20c is the reference point Ps on the docking area 20.

The self-guidance control unit 33 changes the control laws of adjustment of the approaching position and orientation of the movable part 12 according to the length of the reference point distance Ls so that the movable part 12 can smoothly enter the docking area 20.

First, the self-guidance control unit 33 receives the reference point distance Ls obtained by the reference point detection unit 35. The reference point detection unit 35 obtains the reference point distance Ls by calculation using the data of polar coordinates of the point A and the point B and the distance to the center point H, LH. The reference point detection unit 35 cab calculate the reference point distance Ls also from the data of polar coordinates of the point C and the point D and the distance to the center point LH, and can calculate the distance to the center point LH to obtain the reference point distance Ls based on the fact that the center line (the straight line passing through the center point H, the center of the laser distance sensor 34, and the center of the pedestal trolley unit 18) is approximately perpendicular to the lateral wall 20c of the docking area 20 as a result of the adjustment of orientation.

In this manner, the movable part 12 moves toward the docking area 20 of the stationary part 11 by self-guidance so that the movable part 12 and the stationary part 11 combine to be component members of the bed 10. When the movable part 12 moving further into the docking area 20, the movable part 12 adjusts its approaching position and orientation with reference to the point C and the point D.

However, the movable part 12 may hit one of the contact sensors 50a, 50b, 50c, and 50d at the four corners of the pedestal trolley unit 18 against the lateral wall 20a or 20b because of a low accuracy of the laser distance sensor 34 or an error in measurement data.

In this case, the contact sensors 50a, 50b, 50c, and 50d detect a contact force generated by contact with the other object, and the movable part 12 performs an avoidance operation under an avoidance instruction issued by the avoidance instruction unit 51 based on the contact force. The movable part 12 performs the avoidance operation with reference to a rotation center which changes according to the positional relationship between the movable part 12 and the docking area 20. It is known that, in general, motional properties greatly vary according to the position of a rotation center.

The point Q2 (0, 1.5) shown in FIG. 5 is a rotation center for an avoidance operation of the movable part 12 when the contact sensor 50a detects a contact force while the movable part 12 is moving toward the docking area 20 by self-guidance. The point Q2 is data of two-dimensional coordinates indicating that the point Q2 is distant from the point Q1 by 0 m in the x-axis direction and 1.5 m in the y-axis direction.

The point Q1 is a rotation center for avoidance operation of the movable part 12 when the contact sensor 50a detects a contact force while the movable part 12 is not moving by self-guidance (that is, the movable part 12 is in normal operation). (The point Q1 is the same as the rotation center of the joystick 32.)

Figure 6:
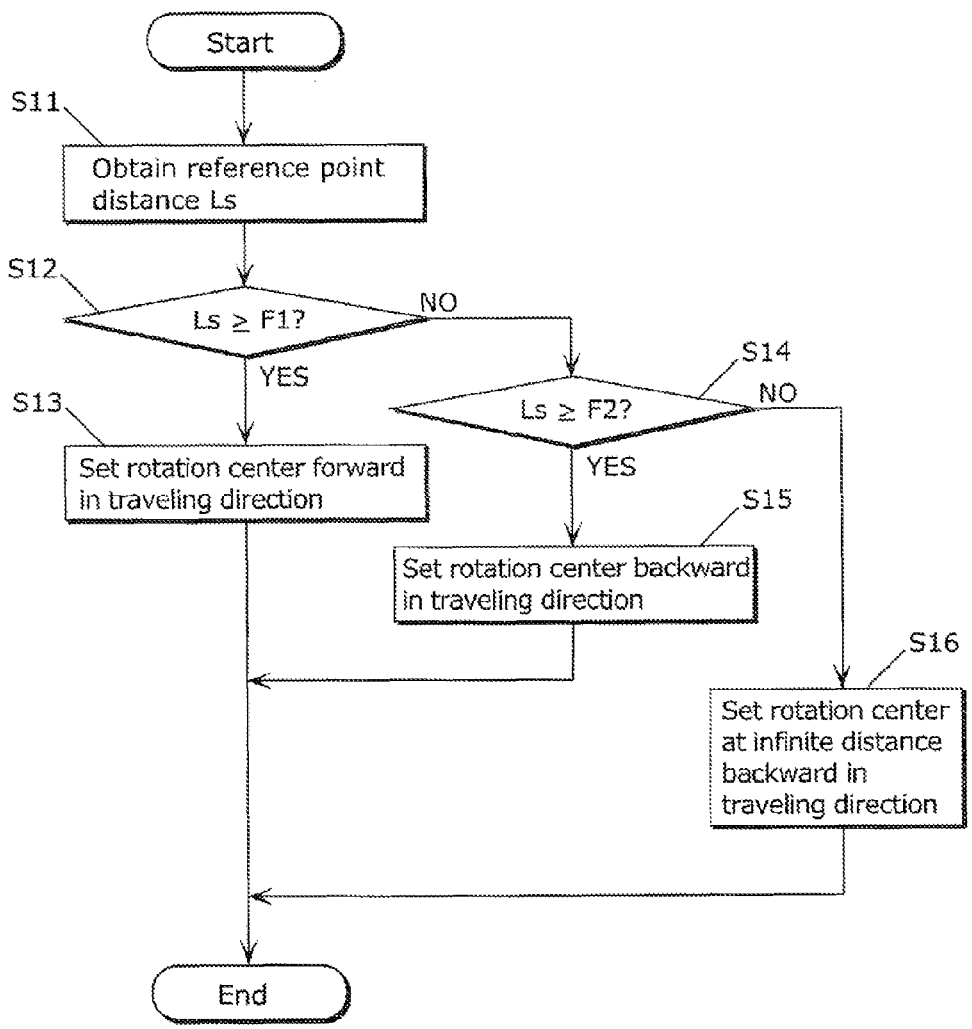
FIG. 6 is a flowchart of a rotation center setting unit according to Embodiment 1.

Next, setting and changing of the rotation center shall be described below using a flowchart shown in FIG. 6 and a table 52b of conditions for change of a rotation center shown in FIG. 7.

First, when the self-guidance start switch 38 is pressed, the movable part 12 moves toward the docking area 20 by self-guidance, and the rotation center setting unit 52 obtains rotation centers for avoidance operation for the respective contact sensors 50a, 50b, 50c, and 50d. In Embodiment 1, four rotation centers are set for each of the contact sensors 50a, 50b, 50c, and 50d. The four rotation centers are stored in the movable part 12 in advance.

The following will describe the case where the contact sensor 50a comes in contact with another object and the rotation center setting unit 52 sets a rotation center corresponding to the contact sensor 50a.

A reference point detection unit which obtains a reference point distance Ls to a reference point on the docking area 20 is used as a positional relationship detection unit to detect a positional relationship of the movable part 12 to the docking area 20. The reference point detection unit 35 to function as the positional relationship detection unit includes the docking point detection unit 36 and the reference point detection unit 35.

The docking point detection unit 36 detects, from data of polar coordinates detected by the laser distance sensor 34, a center point H represented by a polar coordinate indicating an angle of zero, and then the reference point detection unit 35 calculates a reference point distance Ls to the reference point Ps on the docking area 20 from the data of polar coordinates detected by the docking point detection unit 36.

The rotation center setting unit 52 obtains the reference point distance Ls from the reference point detection unit 35 (Step S11). Next, the rotation center setting unit 52 determines whether or not the reference point distance Ls is equal to or longer than a distance F1 (0.7 m), which indicates that part of the movable part 12 is inside the docking area 20 (Step S12). Here, the distance F1 indicating that the movable part 12 has entered the docking area 20 is determined so that it is indicated that a tip of the movable part 12 has reached a position at 20% inside from the mouth of the docking area 20 to the farthest wall in the direction from the point A to the point C.

When the reference point distance Ls is equal to or longer than the distance F1, the rotation center setting unit 52 sets a rotation center corresponding to the contact sensor 50a forward in a traveling direction of the movable part 12 shown in FIG. 5 (Step S13).

The traveling direction is a direction in which the movable part 12 travels to approach the docking area 20. In Embodiment 1, the movable part 12 and the docking area 20 combine so that the lateral face 18a of the movable part 12 and the lateral wall 20c of the docking area 20 face each other, and thus the traveling direction of the movable part 12 is perpendicular to the lateral face 18a. The direction is the same as the y-axis direction of the movable part 12.

On the other hand, when the reference point distance Ls is shorter than the distance F1, the rotation center setting unit 52 determines whether or not that the distance is equal to or longer than an end distance F2 (0.1 m), which indicates that the movable part 12 is close to the end of the docking area 20 (that is, close to the lateral wall 20c) (Step S14).

Here, in Embodiment 1, since the reference point Ps is set on the end of the docking area 20 which coincides with the line between the point C and the point D, the rotation center setting unit 52 can make the determination by directly comparing the reference point distance Ls and the end distance F2. In the case where the reference point Ps is set at a position other than the above, the rotation center setting unit 52 can make the determination by comparing the end distance F2 and a distance Ls2 which is a distance to a second reference point, Ps2 on the end of the docking area 20 coinciding with the line between the point C and the point D.

When the reference point distance Ls is equal to or longer than the end distance F2, the rotation center setting unit 52 sets a rotation center corresponding to the contact sensor 50a at a point Q3 (0, −1.5) which is located backward in the traveling direction of the movable part 12 as shown in FIG. 8 (Step S15).

On the other hand, when the reference point distance Ls is shorter than the end distance F2, the rotation center setting unit 52 sets a rotation center corresponding to the contact sensor 50a at a point Q4 (0, −∞) which is at an infinite distance backward in the traveling direction of the movable part 12 (not shown). Instead, the rotation center may be set at a point at an infinite distance forward in the traveling direction of the movable part 12. In this case, the movable part 12 moves around the rotation center apparently parallel to the x-axis direction (Step S16).

Figure 7:
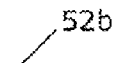
FIG. 7 is a table of conditions of setting a rotation center according to Embodiment 1.

The rotation center setting unit 52 thus sets the rotation centers according to the reference point distance Ls as shown in the table 52b of the conditions of setting a rotation center in FIG. 7.

The rotation center setting unit 52 sets a rotation center each time the laser distance sensor 34 scans the detection area and calculates a reference distance Ls.

Figure 9:
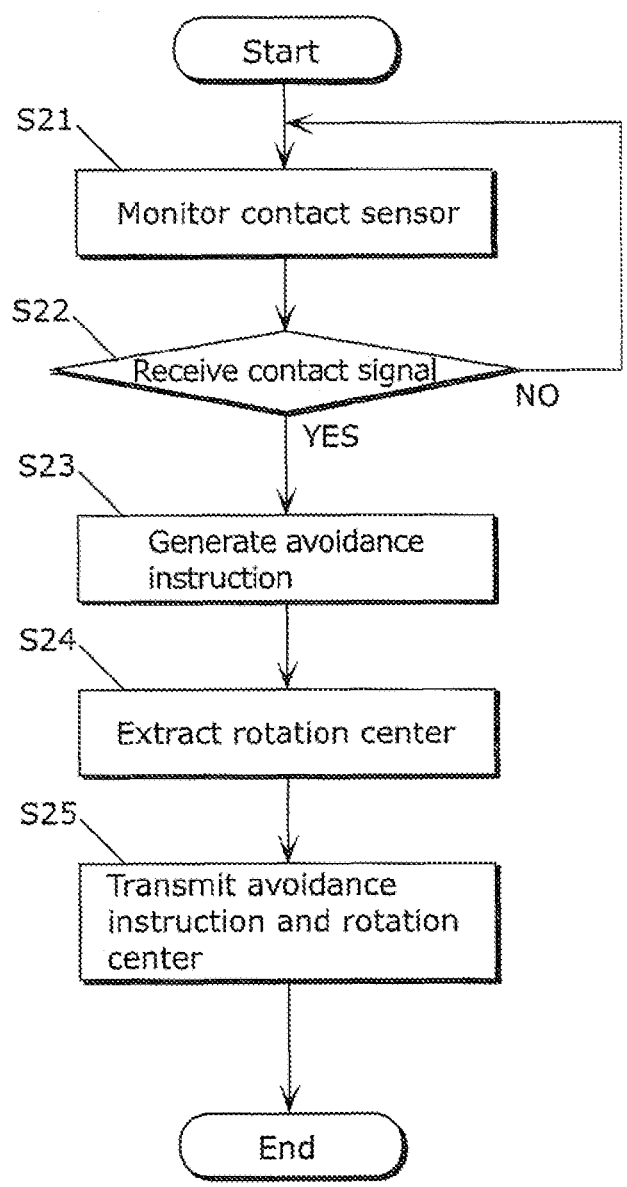
FIG. 9 is a flowchart of an avoidance instruction unit according to Embodiment 1.

Next, operation of the avoidance instruction unit 51 shall be described using a flowchart in FIG. 9. The avoidance instruction unit 51 issues an avoidance instruction in response to a reaction of each of the contact sensors 50a, 50b, 50c, and 50d, but the following describes an avoidance instruction issued by the avoidance instruction unit 51 in response to a reaction of the contact sensor 50a.

First, the avoidance instruction unit 51 monitors a contact signal transmitted from the contact sensor 50a when the contact sensor 50a detects contact with another object (Step S21). The avoidance instruction unit 51 continues monitoring the contact sensor 50a as long as the avoidance instruction unit 51 receives no contact signal.

Upon receiving a contact signal (Step S22), the avoidance instruction unit 51 generates an avoidance instruction based on a contact force $f_a$. The avoidance instruction is generated according to motional properties represented by (Equation 3), based on the contact force $f_a$ detected by the contact sensor 50a, so as to specify a rotation around the rotation center (Step S23).

[Math. 3]

$$f_a = M_a^\theta \dot{\omega}_a + D_a^\theta \omega_a \quad (3)$$

Here, $M_a\theta \in R$ is an apparent mass property, $D_a\theta \in R$ is an apparent viscosity property, and $\omega_a \in R$ is a rotation velocity around the rotation center Q2. (Equation 3) can be deformed into (Equation 4).

[Math. 4]

$$\omega_a = L^{-1}\left[\frac{1}{M_a^\theta s + D_a^\theta} L[f_a]\right] \quad \text{(Equation 4)}$$

L[•] represents Laplace transform, and $L^{-1}$[•] represents inverse Laplace transform. The avoidance instruction unit 51 then calculates a rotation velocity $\omega_a$ around the rotation center Q2 corresponding to the contact sensor 50a according to (Equation 4) into which a contact force $f_a$ is input.

Here, the generated avoidance instruction indicates only rotation velocity $\omega_a$, and no instruction is generated for motions in the x-axis direction or the y-axis direction.

Next, a rotation center (x2, y2), which is corresponding to the contact sensor 50a, is extracted from the rotation center setting unit 52 (Step S24). The rotation center is data of two-dimensional coordinators indicating a distance in the x-axis direction and a distance in the y-axis direction from the center point Q1 of the movable part 12 to the Q2.

Next, the rotation center corresponding to the contact sensor 50a and the avoidance instruction are transmitted to the avoidance instruction translation unit 54 (Step S25).

Next, the avoidance instruction translation unit 54 receives the rotation center and the avoidance instruction from the avoidance instruction unit 51. Then, the avoidance instruction translation unit 54 translates the avoidance instruction and the rotation center corresponding to the contact sensor 50a into a move instruction to drive the body drive unit 31.

The avoidance instruction translation unit 54 translates the rotation velocity around the rotation center Q2, which is the avoidance instruction generated by the avoidance instruction unit 51, into a motion velocity around the rotation around Q1. The motion velocity around the rotation around Q1 is the move instruction. Here, the motion velocity around the rotation center Q2 is expressed as $V_a=[0, 0, \omega_a]^T \in R^3$, and the motion velocity around the rotation center Q1 is expressed as $V_b=[V_b^x, V_b^y, \omega_b]^T \in R^3$.

It is assumed that the rotation center Q2 is located at $(x_2, y_2)$ and the rotation center Q1 and the rotation center Q2 have a positional relationship as shown in FIG. 5. Then, (Equation 5) below is satisfied for the motion velocity $V_a$ around the rotation center Q2 and the motion velocity $V_b$ around the rotation center Q1.

[Math. 5]

$$\begin{bmatrix} v_a^x \\ v_a^y \\ \omega_a \end{bmatrix} = \begin{bmatrix} 0 & 0 & l_2\cos\theta_2 \\ 0 & 0 & -l_2\sin\theta_2 \\ 0 & 0 & 1 \end{bmatrix} \begin{bmatrix} 0 \\ 0 \\ \omega_a \end{bmatrix} \quad \text{(Equation 5)}$$

It should be noted that there are relationships expressed as (Equation 6) and (Equation 7).

[Math. 6]

$$l_2 = \sqrt{x_2^2 + y_2^2} \quad (6)$$

[Math. 7]

$$\theta_2 = a\tan 2(y_2, x_2) \quad (7)$$

The avoidance instruction translation unit 54 translates, according to (Equation 5), (Equation 6), and (Equation 7), the rotation velocity $V_a$ around the rotation center Q2 calculated by the avoidance instruction unit 51 into the motion velocity $V_b$ around the rotation center Q1.

Control is performed in this manner so that an operation necessary for smooth combining of the stationary part 11 and the movable part 12 can be achieved only by a motion around a rotation center. Parameters can be therefore adjusted easily. Furthermore, the apparent mass property M and the apparent viscosity property D are adjusted by changing only the parameters for a rotation around a rotation center, so that the parameters of motional properties can be easily adjusted.

In other words, an avoidance operation around a rotation center and orientation adjustment operation based on a contact force fa are performed using a rotation center appropriately set. In this case, only two parameters of Maθ and Daθ, which are related to each other, need to be adjusted as shown in (Equation 3). Adjustment of the parameters is thus performed easily.

For example, it is possible to adjust an avoidance instruction for a rotation center of Q1 when the reference point distance Ls is equal to or longer than F1, but it is not preferable because necessary parameter adjustment takes a long time. This is because adjustment of motion in the x-axis direction and the y-axis direction and the z-axis rotation is necessary for the movable part 12 to adjust orientation for a rotation center of the point Q1 with avoiding an object upon a reaction of the contact sensor 50a when the reference point distance Ls is equal to or longer than F1.

In contrast, in Embodiment 1, a rotation center is appropriately adjusted according to the positional relationship between the docking area 20 and the movable part 12 so that avoidance from a contact point between the docking area 20 and the movable part 12 and adjustment of orientation can be performed at the same time only by a rotation around the rotation center (a z-axis rotation). The parameters can be therefore adjusted with ease.

Figure 10:
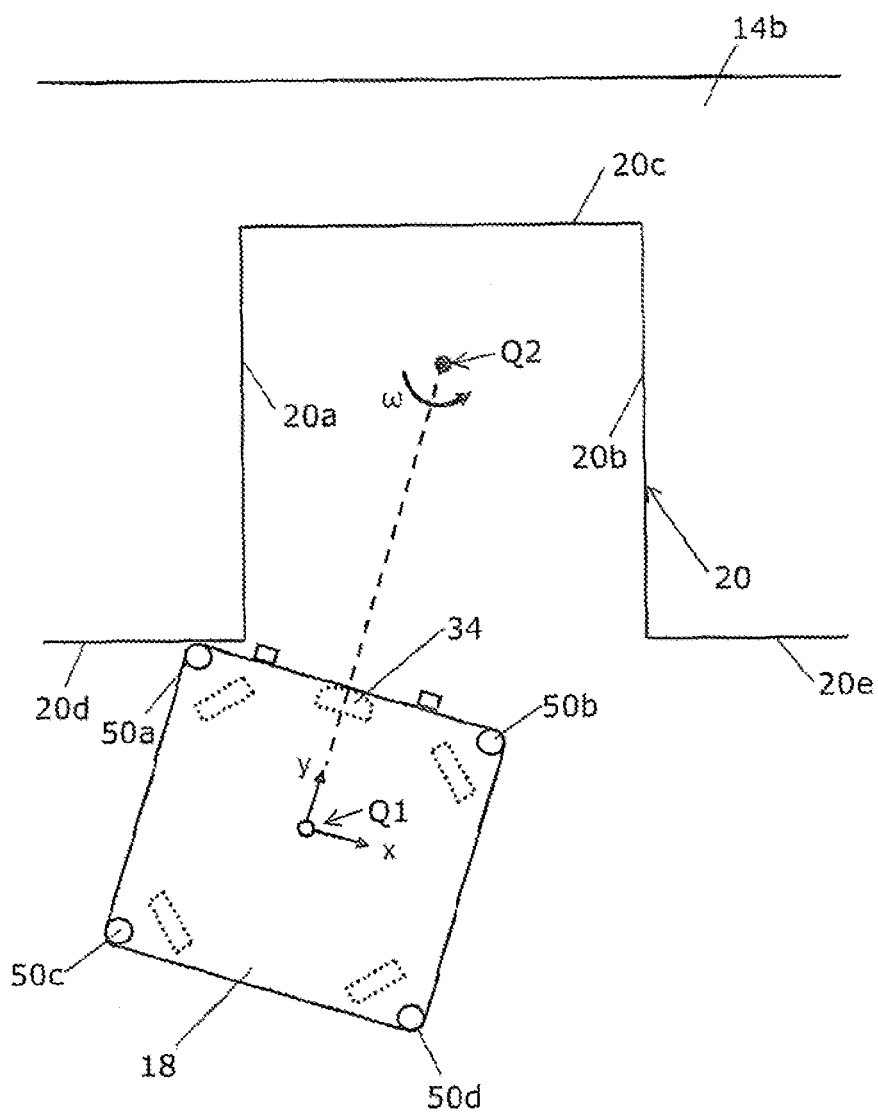
FIG. 10 illustrates a top view showing contact of the movable part according to Embodiment 1 with a left lateral wall of the foot unit.
Figure 11:
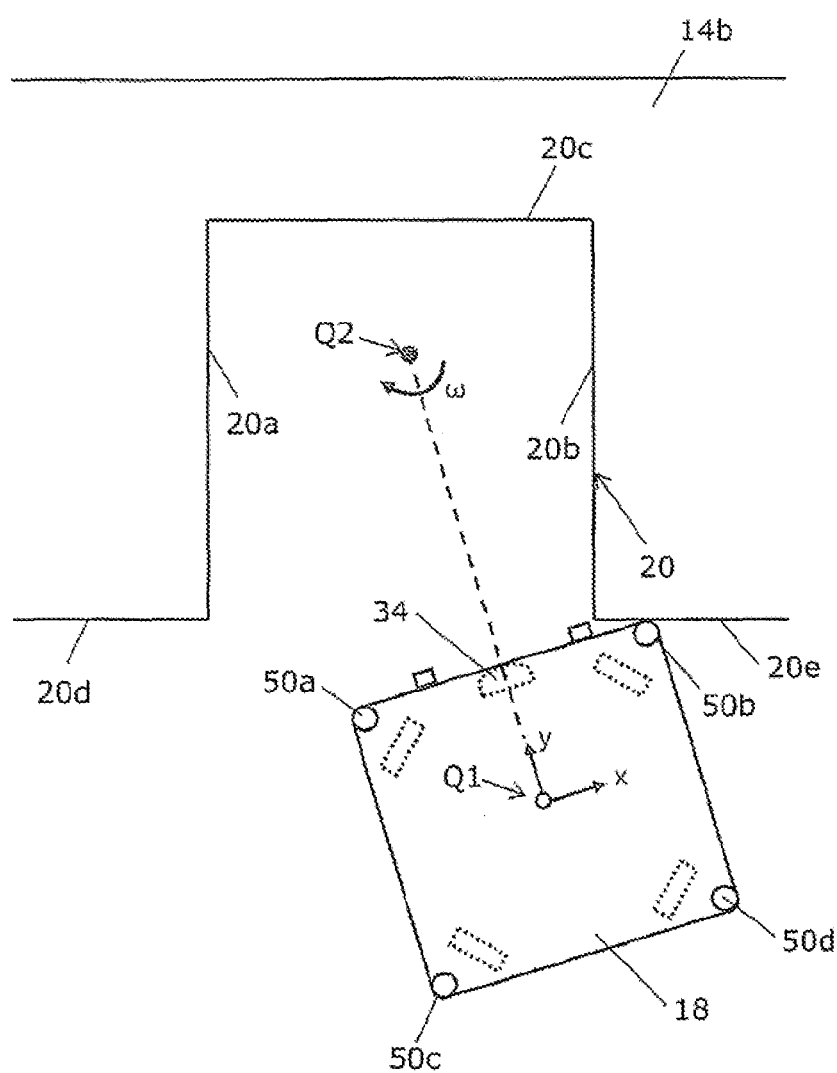
FIG. 11 illustrates a top view showing contact of the movable part according to Embodiment 1 with a right lateral wall of the foot unit.

A rotation center is set forward in a traveling direction (for example, Q2) when the reference point distance Ls is equal to or longer than F1 because it allows the movable part 12 to adjust its orientation while avoiding a contact only by a rotation around the rotation center when the movable part 12 comes in contact with the lateral wall 20d or 20e at the entrance side of the foot unit 14b before entering the docking area 20 as shown in FIG. 10 and FIG. 11. FIG. 10 shows a contact avoidance operation and an orientation adjustment operation when the contact sensor 50a comes in contact with the lateral wall 20d at the left of the traveling direction. FIG. 11 shows a contact avoidance operation and an orientation adjustment operation when the contact sensor 50b comes in contact with the lateral wall 20e at the right of the traveling direction.

Figure 12:
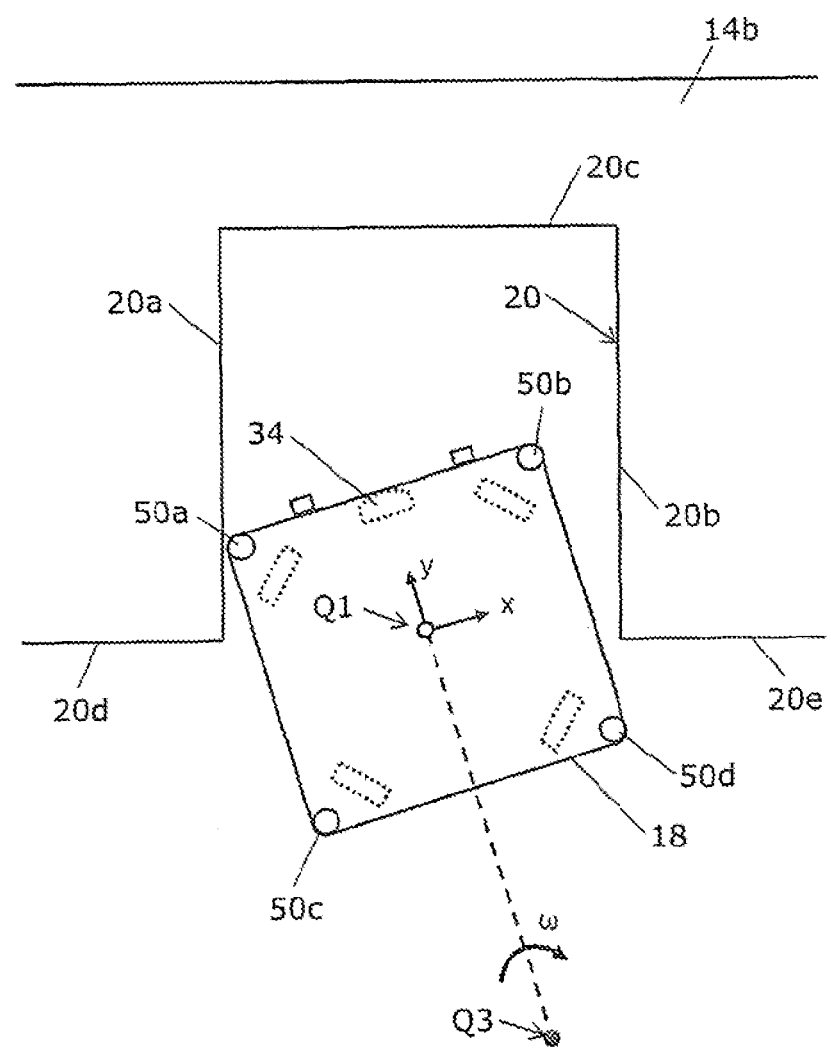
FIG. 12 illustrates a top view showing contact of the movable part according to Embodiment 1 with a left lateral wall of the docking area.
Figure 13:
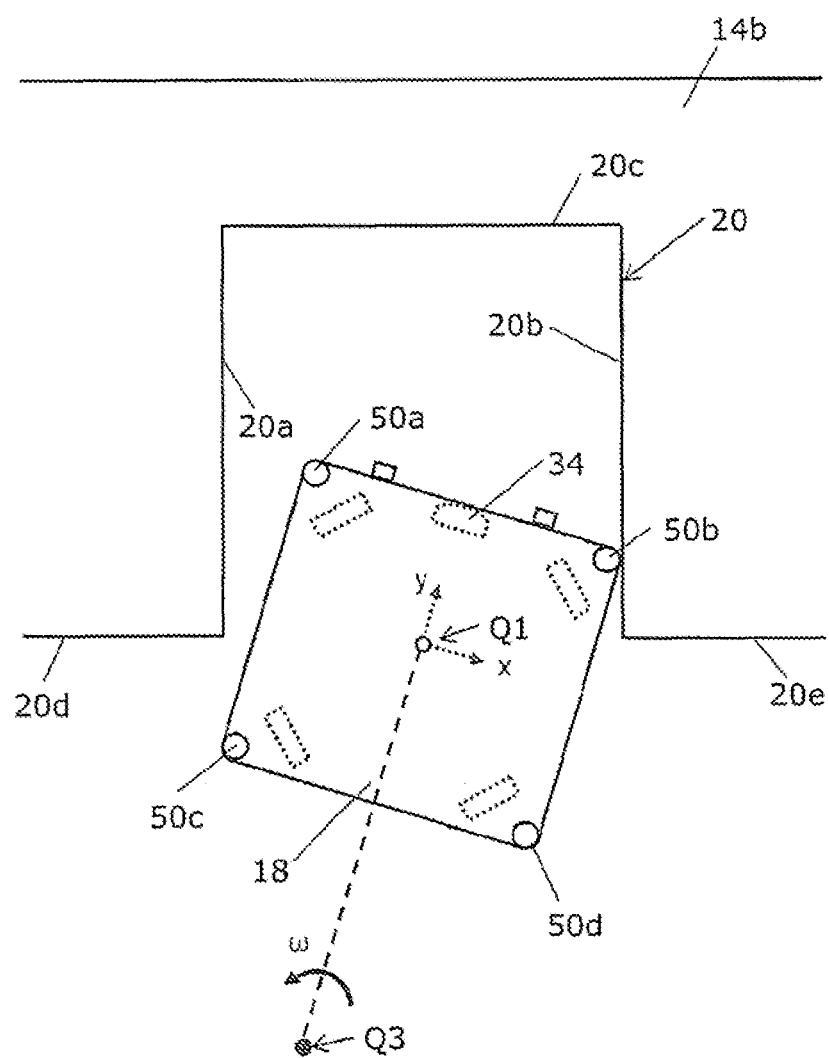
FIG. 13 illustrates a top view showing contact of the movable part according to Embodiment 1 with a left lateral wall of the docking area.
Figure 14:
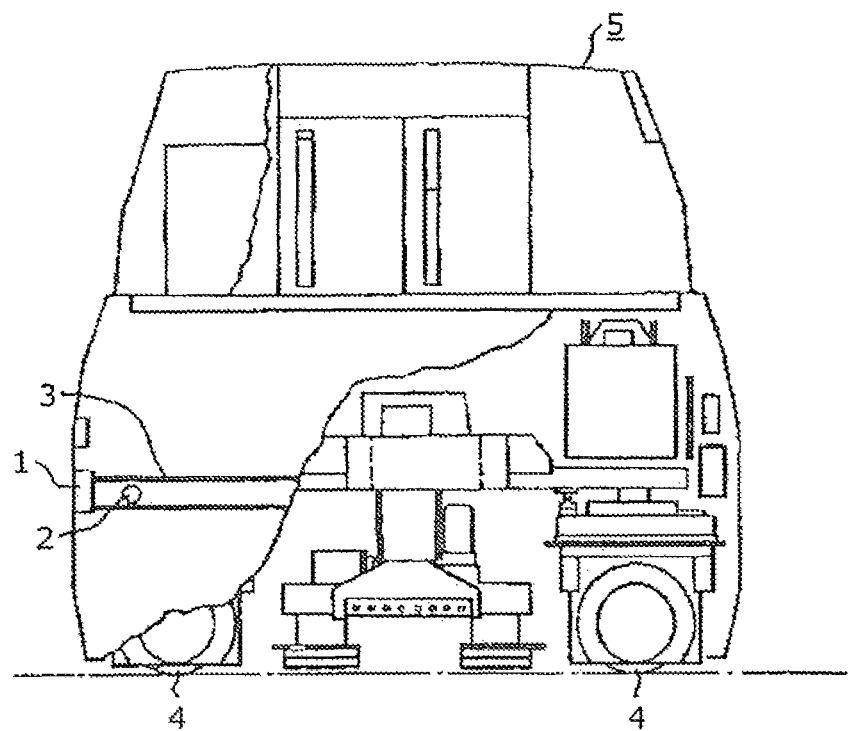
FIG. 14 illustrates a cross-sectional view of a conventional cleaning robot.

When the movable part 12 comes in contact with the lateral wall 20a or 20b in moving into the docking area 20 as shown in FIG. 12 or FIG. 13 and the reference point distance Ls is equal to or longer than F2 and shorter than F1, it is preferable that the rotation center be set backward in the traveling direction (for example, Q3) so that the movable part 12 can adjust its orientation while avoiding the contact. FIG. 12 shows a contact avoidance operation and an orientation adjustment operation when the contact sensor 50a comes in contact with the lateral wall 20a at the left while the movable part 12 is moving into the docking area 20. FIG. 14 shows a contact avoidance operation and an orientation adjustment operation when the contact sensor 50a comes in contact with the lateral wall 20b at the right while the movable part 12 is moving into the docking area 20.

At this stage, adjustment of orientation has been almost completed (or adjustment of orientation is not necessary) and only avoidance of contact is necessary. It is therefore preferable that the rotation center be set at an infinite distance forward or backward in a traveling direction when the reference point distance Ls is shorter than F2.

It is to be noted that rotation centers are set for each of the contact sensors 50a, 50b, 50c, and 50d, and that the rotation centers are set for the contact sensors 50b, 50c, and 50d in the same manner as for the contact sensor 50a. Specifically, the rotation center of the movable part 12 is set at Q1 in normal operation, and the rotation center is set at Q2 when the reference point distance Ls is equal to or longer than F1.

When the reference point distance Ls is shorter than F1 and equal to or longer than F2, the rotation center is set at Q3. When the reference point distance Ls is shorter than F2, the rotation center is set at an infinite distance forward or backward in a traveling direction.

In the case where the contact sensor 50c or the contact sensor 50d located at the side opposite to a traveling direction detects contact when the reference point distance Ls is equal to or longer than F2, the rotation center is set forward in the traveling direction. In the case where the contact sensor 50c or the contact sensor 50d detects contact when the reference point distance Ls is shorter than F2, the rotation center is set at a point Q4, which is located at an infinite distance forward or backward in the traveling direction.

The rotation center is set forward in the traveling direction when the reference point distance Ls is equal to or longer than F2 because the setting allows the movable part 12 to adjust its orientation while avoiding contact when movable part upon contact with the a side AC or a side BD during moving into the docking area 20.

The rotation center is set at an infinite distance forward or backward in the traveling direction when the reference point distance Ls is shorter than F2 because adjustment of orientation has been almost completed (or adjustment of orientation is not necessary) and only avoidance of contact is necessary.

In Embodiment 1, the contact sensors 50a, 50b, 50c, and 50d detect a contact force. The sensors to be used as the contact sensors 50 are sensors which detect contact based on displacement detected using both an elastic body such as a spring and a potentiometer.

It should be noted that, according to (Equation 5), the longer the distance $l_2$ between the rotation center Q1 and the rotation center Q2 is, the higher the velocity $V_b$ of the pedestal trolley unit 18 is. In the case where the velocity $V_b$ of the pedestal trolley unit 18 is so large, it is preferable that the rotation velocity $\omega_b$ around Q1 be modified into $\omega_{b\#}$ as represented by (Equation 8) as the distance $l_2$ increases.

[Math. 8]

$$\omega_{b_-} = \frac{1}{l_2}\omega_b \qquad \text{(Equation 8)}$$

Here, $\omega_{b\#} \in R$ is a rotation velocity resulting from the modification of a rotation velocity $\omega_b$ around the rotation center Q2. It is also possible to prevent increase in the velocity $V_b$ at the center of the pedestal trolley unit also by reducing the contact force $f_a$ or by increasing the apparent mass property $M\theta$ or the apparent viscosity property $D\theta$. With this, the velocity $V_b$ at the center of the pedestal trolley unit 18 can made unchanged even for a large distance $l_2$.

INDUSTRIAL APPLICABILITY

A bed according to the present invention includes a movable part capable of smooth move with a small number of parameters, and is therefore useful as a bed which is formed of a combination of the movable part and a stationary part.

REFERENCE SIGNS LIST

10 Bed
11 Stationary part
12 Movable part
13 Base unit
14a Bed base unit
14b Foot unit
15 Stationary part lateral base unit
16 Seat unit
17 Armrest unit
18 Pedestal trolley unit
18a Side wall
19 Operation panel
20 Docking area
20a Lateral wall
20c Lateral wall
31 Body drive unit
32 Joystick
33 Self-guidance control unit
34 Laser distance sensor
35 Reference point detection unit 36 Docking point detection unit
37 Docking area recognition unit
38 Self-guidance start switch
40 Sensor
41 Bed transform drive unit
43 Separation switch
44 Wheel
50 Contact sensor
50a Contact sensor
51 Avoidance instruction unit
52 Rotation center setting unit
54 Avoidance instruction translation unit

The invention claimed is:

1. A bed comprising:
a stationary part; and
a movable part capable of being docked in a docking area which is a recess in the stationary part,
wherein the movable part includes:
a contact sensor which detects a contact force generated by contact with another object;
an avoidance instruction unit configured to generate an avoidance instruction according to the contact force received from the contact sensor, the avoidance instruction being information regarding a rotation of the movable part;
a position detection unit configured to detect a positional relationship of the movable part to the docking area;
a rotation center setting unit configured to set, according to the positional relationship detected by the position detection unit, a rotation center for the avoidance instruction generated by the avoidance instruction unit; and
a control unit configured to move the movable part around the rotation center set by the rotation center setting unit.

2. The bed according to claim 1,
wherein the position detection unit is configured to obtain a reference point distance Ls which is a distance to a reference point on the docking area, and
the rotation center setting unit is configured to set the rotation center according to the reference point distance Ls.

3. The bed according to claim 1, further comprising
a plurality of contact sensors each of which is associated with a different rotation center.

4. A method of combining a movable part and a stationary part having a docking area which is a recess in the stationary part, by docking the movable part in the docking area to form a bed including the movable part, the stationary part, and the docking area, the method comprising:
detecting a contact force generated by contact of the movable part with another object, using a contact sensor included in the movable part;
generating an avoidance instruction according to the contact force received from the contact sensor, the avoidance instruction being information regarding a rotation of the movable part;
detecting a positional relationship of the movable part to the docking area;
setting, according to the detected positional relationship, a rotation center for the avoidance instruction; and
performing an avoidance operation by moving around the set rotation center.

5. The method according to claim 4,
wherein a reference point distance Ls, which is a distance from the movable part to a reference point on the docking area, is obtained as the positional relationship.

6. The method according to claim 5,
wherein the rotation center is set forward in a traveling direction of the movable part when the reference point distance Ls is equal to or longer than a distance F1, which indicates that the movable part is yet to enter the docking area.

7. The method according to claim 5,
wherein the rotation center is set backward in a traveling direction of the movable part when the reference point distance Ls is shorter than a distance F1, which indicates that the movable part has entered the docking area.

8. The method according to claim 5,
wherein the rotation center is set at an infinite distance forward or backward in a traveling direction of the movable part when the reference point distance Ls is shorter than an end distance F2, which indicates that the movable part is close to an end of the docking area.

9. The method according to claim 4,
wherein the movable part is moved at a rotation velocity of $\omega_a \in R$ calculated using (Equation 4), which is $$\omega_a = L^{-1}\left[\frac{1}{M_a^\theta s + D_a^\theta} L[f_a]\right], \quad \text{(Equation 4)}$$

where $f_a$ is the contact force detected by the contact sensor,
$M_a \theta \in R$ is an apparent weight property of the movable part, and
$D_a \theta \in R$ is an apparent viscosity property of the movable part.

10. The method according to claim 4,
wherein the bed includes a plurality of contact sensors, and
the rotation center set for one of the contact sensors which detects contact and the rotation center set for another of the contact sensors which detects contact are different from each other.

11. The method according to claim 10,
wherein, when at least two of the contact sensors detect contact around a same time, a plurality of rotation velocities around the rotation centers set for the respective contact sensors are combined, and
the movable part is moved at a rotation velocity resulting from the combining.

* * * * *